Oct. 8, 1935.  C. D. SPRACHER  2,016,755
LINE SPOOLER FOR OIL FIELD DRAW WORKS
Filed Jan. 30, 1931

INVENTOR.
CLIFFORD D. SPRACKER.
BY
ATTORNEY.

Patented Oct. 8, 1935

2,016,755

UNITED STATES PATENT OFFICE 2,016,755

LINE SPOOLER FOR OIL FIELD DRAW WORKS

Clifford D. Spracher, Long Beach, Calif., assignor of one-half to William C. Wheat, Belvedere Gardens, Calif.

Application January 30, 1931, Serial No. 512,309

2 Claims. (Cl. 242—157)

This invention relates to line spoolers used on the draw works of an oil well although it also might be used in other places.

The object of my invention is to provide a better means of spooling the line on the drum.

An advantage of my invention resides in the fact that it has nothing complicated to get out of order. It being operated by oil makes it very simple and easy to adjust. It is entirely adjusted by the turning of a stop cock.

In the drawing

Figure 1:
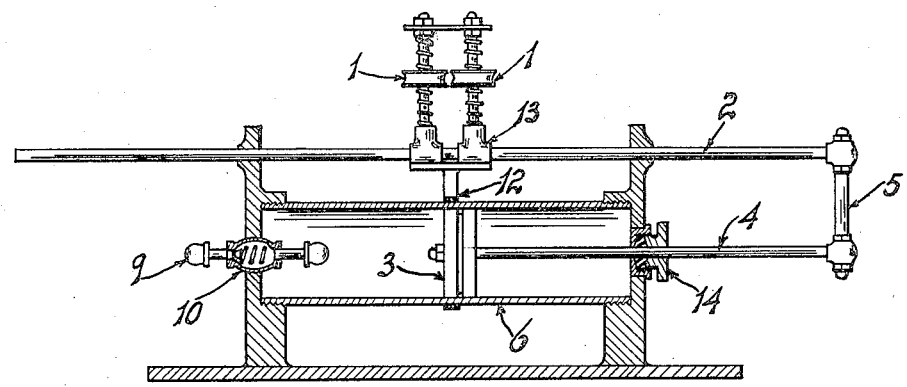
Fig. 1 is a longitudinal sectional view of the line spooler.
Figure 2:
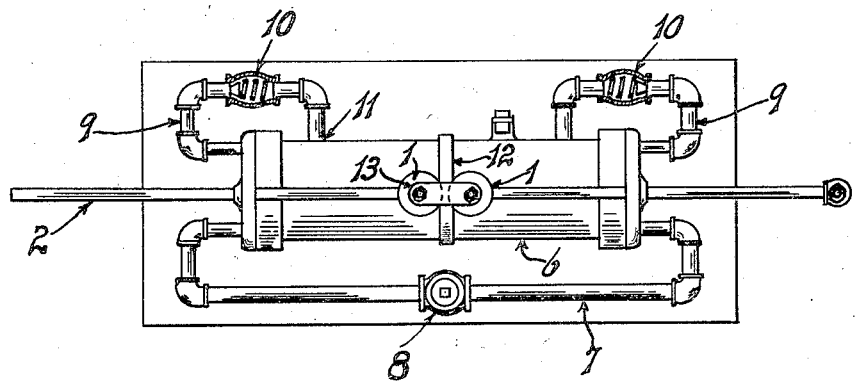
Fig. 2 is a front view of the same.

Referring more particularly to the drawing. The line runs through the pulleys 1, 1. While the line is moving back and forth on the drum it also moves the rod 2, back and forth which in turn is connected to the piston 3 by the piston rod 4 and also rod 5. The cylinder 6 is entirely filled with oil or some other liquid, so the piston 3, moving back and forth forces the oil through the line 7, which has a stop cock or valve 8, to regulate the amount of flow or in other words the pressure on the line to be spooled.

When the piston 3, gets near the end of its stroke the pressure is released by means of the line 9, and check valve 10. In other words when the piston gets past the opening 11, the oil can bypass around the piston. But as soon as the piston starts back the check valve stops the oil going through this line so it all has to go through the stop cock 8, until it gets about to the other end of the stroke. The object of this is to take the pressure off of the line to be spooled as soon as it gets near the sides of the drum and then hold a pressure on it again as soon as it starts back. When the side pressure of the spooler is taken off the line, it will naturally start the next layer on the drum, i. e., the side of the drum will start the line back. As soon as the line has started on a new layer, the spooler will again exert pressure on said line.

The brace 12, fits about half way around the cylinder and slides thereon which merely acts as a support for the carriage 13. The piston rod 4, works through the packing gland 14.

I claim:

1. A line spooler comprising a cylinder, a piston reciprocally mounted in said cylinder, line engaging means, means coupling said line engaging means and the piston, a pipe connecting both ends of the cylinder, a valve in said pipe, and pressure release means at each end of said cylinder, guide means upon which said line engaging means is mounted, and a brace on the line engaging means, said brace slidably engaging the cylinder.

2. A line spooler comprising a cylinder, a piston reciprocally mounted in said cylinder, line engaging means, means coupling said line engaging means and the piston, a pressure supply pipe extending into both ends of the cylinder, a valve in said pipe, and pressure release means at each end of said cylinder, said pressure release means comprising a pipe extending out of each end of the cylinder and into the side of said cylinder adjacent the end, and a check valve in said last named pipe, guide means upon which said line engaging means is mounted, and a brace on the line engaging means, said brace slidably engaging the cylinder.

CLIFFORD D. SPRACHER.